United States Patent Office 3,505,306
Patented Apr. 7, 1970

3,505,306
FIBER REACTIVE PHOTOCHROMIC DYES
John Kazan, Jr., Somerville, and Walter Henry Foster, Jr., Freehold, N.J., assignors to American Cyanamid Company, Stamford, Conn., a corporation of Maine
No Drawing. Filed Jan. 26, 1967, Ser. No. 611,840
Int. Cl. C09b 45/12; D06p 1/10
U.S. Cl. 260—146                                  5 Claims

ABSTRACT OF THE DISCLOSURE

A defined class of fiber-reactive dye compounds comprising photochromic mercury dithizonates containing fiber-reactive groups, such as the dichloro-s-triazinyl group, when applied as disperse dyes, react with fabrics containing reactive hydrogens, such as nylon, and are firmly bound thereto. The extent to which the dyes are fixed on the fabrics is substantially increased by an after-treatment with aqueous alkali. The dyed materials exhibit photochromic properties.

---

This invention relates to a new class of fiber-reactive photochromic dye compounds. It also relates to a process of applying these compounds to fibrous textile materials containing reactive hydrogens, such as nylon, and to the dyed materials, per se.

The new fiber-reactive dye compounds of the invention are derivatives of mercuric complexes of diaryl thiocarbazones which correspond to the formula:

(I)                      D—M where D is

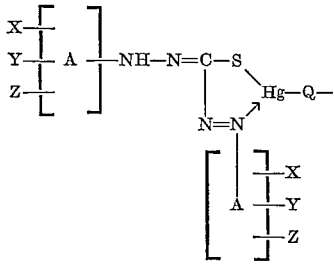

wherein Q is a divalent aromatic radical, such as phenylene, tolylene, naphthylene, etc., A is an aryl radical, such as phenyl or naphthyl, X, Y and Z are individually hydrogen, lower alkyl, lower alkoxy, halo, nitro or di-lower alkylamino radicals, and M is a fiber-reactive moiety selected from the group consisting of:

(a) An s-triazinylamino radical containing one or two chlorine or bromine atoms directly attached to the triazine ring;
(b) A pyrimidinylamino radical containing one or two chlorine or bromine atoms directly attached to the pyrimidinyl ring;
(c) A chloroacetylamino radical;
(d) A beta-chloropropionylamino radical;
(e) A beta-chloroethylsulfonyl radical;
(f) A beta-sulfatoethylsulfonyl radical;
(g) A vinylsulfonyl radical;
(h) An N-(beta-chloroethyl)sulfamoyl radical;
(i) An N-(beta-sulfatoethyl)sulfamoyl radical; and
(j) A methylolated N,N-bis(beta-carbamoylethyl)-sulfamoyl radical.

It has been found in accordance with this invention that the dye compounds can be applied as disperse dyes to animal fibers, such as wool and silk, to cellulose ester fibers and to synthetic fibers, such as nylon, and that the fixation of the dyes on the fibers is increased by an after-treatment with alkali as shown hereafter.

The new fiber-reactive dye compounds of the present invention (Formula I) can be made by the following procedures:

(a) Dichloro- and dibromo-s-triazinylamino compounds are obtained by reacting one mole of an aminoarylmercuric complex of a diaryl thiocarbazone, represented by the formula:

(II)

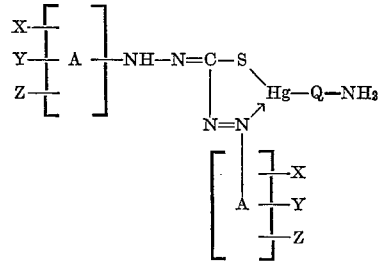

where Q, A and X, Y and Z have the same meanings as in Formula I, with one mole of cyanuric chloride or bromide, the said mercuric complex (of Formula II) having first been prepared by reaction of a diaryl thiocarbazone with an aminoarylmercuric acetate or halide. Monochloro- and monobromo-s-triazinylamino compounds are obtained by reacting one mole of the aminoarylmercuric complex of Formula II with one mole of a dichloro- or dibromo-s-triazine of the formula:

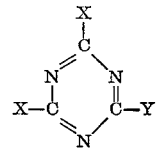

where the X's are chloro or bromo atoms and Y is alkyl, aryl, amino, an organic radical containing N, O or S linkage to the triazine ring, or —NH—D.

(b) Mono- and dichloro and -bromopyrimidinylamino compounds are obtained by reacting one mole of the aminoarylmercuric complex of Formula II with one mole of a halopyrimidine containing at least two chlorine or bromine atoms in the 2-, 4- and 6-positions.

(c) Chloroacetylamino compounds are obtained by reacting one mole of the aminoarylmercuric complex of Formula II with one mole of chloroacetyl chloride.

(d) Beta-chloropropionylamino compounds are obtained by reacting one mole of the aminoarylmercuric complex of Formula II with one mole of beta-chloropropionyl chloride. By then eliminating hydrogen chloride, the corresponding acrylamide derivatives, which are also useful in this invention, are obtained.

(e) Beta-chloroethylsulfonyl compounds are obtained by reacting a diaryl thiocarbazone with a beta-chloroethylsulfonylarylmercuric chloride.

(f) Beta-sulfatoethylsulfonyl compounds are obtained by reacting a diaryl thiocarbazone with a beta-sulfatoethylsulfonylarylmercuric chloride.

(g) Vinylsulfonyl compounds are obtained by reacting a diaryl thiocarbazone with a vinylsulfonylarylmercuric chloride.

(h) N-(beta-chloroethyl)sulfamoyl compounds are obtained by reacting a diaryl thiocarbazone with an N-(beta-chloroethylsulfamoylarylmercuric chloride.

(i) N-(beta-sulfatoethyl)sulfamoyl compounds are obtained by reacting a diaryl thiocarbazone with an N-(beta-sulfatoethyl)sulfamoylarylmercuric chloride.

(j) Methylolated N,N - bis(beta - carbamoylethyl)sulfamoyl compounds are obtained by reacting N,N-bis(beta-carbamoylethyl)sulfamoyl compounds with formaldehyde, the carbamoyl compounds having been prepared by reaction of a diaryl thiocarbazone with an N,N- bis(beta-carbamoylethyl)sulfamoylarylmercuric chloride.

The substituted arylmercuric salts are obtainable by conventional procedures, such as reaction of a substituted aryl compound with mercuric acetate or reaction of a substituted aryl compound with mercuric acetate or reaction of a substituted aryldiazonium salt with mercuric chloride and cuprous chloride.

The reaction of a diaryl thiocarbazone with a substituted arylmercuric salt is typically exemplified by the reaction of diphenylthiocarbazone (III) and p-aminophenylmercuric acetate (IV) to give (p-aminophenyl) mercuric dithizonate (IIa).

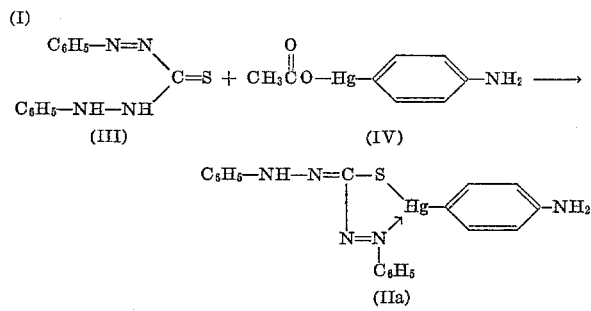

Reaction (1) is conveniently effected at room temperature in a two-phase solvent medium, such as a mixture of chloroform and water, and in the presence of a buffer, such as sodium bicarbonate.

The reaction of an aminoarylmercuric complex of a diaryl thiocarbazone with a cyanuric halide, dihalo-s-triazine, polyhalopyrimidine, chloroacetyl chloride or beta-chloropropionyl chloride is typically exemplified by the reaction of (p-aminophenyl)mercuric dithizonate (IIa) with cyanuric chloride (V) to give the fiber reactive compound p-[(4,6 - dichloro-s-triazin-2-yl)amino]phenylmercuric dithizonate (Ia).

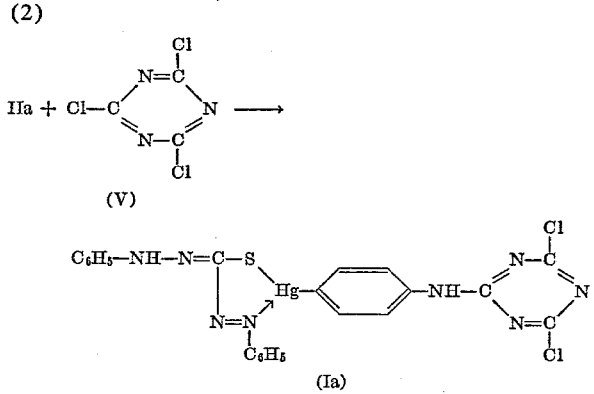

Reaction (2) is conveniently effected in a suitable solvent, such as acetone, and in the presence of a buffer, such as sodium bicarbonate. The reaction is carried out at room temperature or below. Higher reaction temperatures can be used when mono-halo products are desired.

Dihalo-s-triazines which may be used include 2,4-dichloro-6-phenoxy-s-triazine, 2,4 - dichloro-6-phenyl-s-triazine, 2,4 - dichloro-6-methyl-s-triazine, 2,4 - dichloro-6-methylthio-s-triazine, 2,4 - dichloro - 6 - methylamino-s-triazine, etc.

Halopyrimidines which may be used include 2,4,6-trichloropyrimidine, 2,4,6 - tribromopyrimidine, 2,4,5 - trichloropyrimidine, 2,4-dichloro - 6 - methylprimidine, 2,4-dichloro-6-methoxypryimidine, 2,4 - dichloro-6-phenylpyrimidine, etc.

The compounds of this invention are applied to textile materials containing reactive hydrogen by well-known procedures for applying fiber reactive dyes to such fibers. Suitable textile materials for use include those containing various synthetic fibers such as nylon and other polyamide types, cellulose esters such as cellulose acetate, and animal fibers such as wool and silk, etc. The dyeings are made by procedures used for disperse dyes. The wet fastness of the dyeings is improved by an after treatment with alkali.

The dyeings are advantageously made by immersing the textile material in aqueous dispersions of the fiber reactive compounds at the boil or slightly below, for 15–60 minutes. The dispersions are conveniently prepared by dissolving the dye in a water-miscible solvent, such as acetone, and adding the solution to water containing a small amount of a surface active agent, i.e., a dispersing agent, such as a long chain alkyl sulfate.

The alkaline aftertreatment whereby the fixation of the dye is increased, is effected by immersing the dyed fabric in aqueous alkali. Suitable alkalies include sodium hydroxide, potassium hydroxide, lithium hydroxide, sodium carbonate, potassium carbonate, soap and the like. Sufficient alkali is used to neutralize all of the hydrogen chloride which theoretically could be evolved and still keep the mixture alkaline. It is advantageous to carry out the alkali treatment at the boil.

The dyes are thus firmly gound to, and are an integral part of, the textile material. In other words, there has been reaction of the derivative of the arylmercuric complex of a diaryl thiocarbazone with the active-hydrogen-containing textile material.

The fabrics thus dyed have photochromic properties. In the case of the dichlorotriazinylaminophenylmercuric complex of diphenyl thiocarbazone, the color changes from orange to blue when the fabric is irradiated with sunlight or other source of light. It will be appreciated that the retention by the dye of this property, even though it is bound to the fabric through the fiber reactive linkage, is most suprising since the color change involves a drastic alteration in the configuration of the molecule. Thus, though not conclusive, the evidence indicates a cis-trans isomerization and tautomeric shift in the photochromic portion of the molecule, as follows.

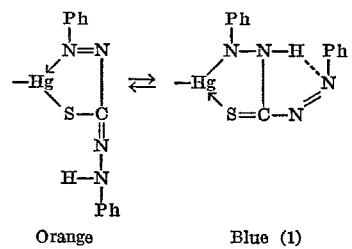

Orange        Blue (1)

While Blue (1) is considered the more likely, it is possible that the structure of the blue form might also be either (2) or (3) as follows.

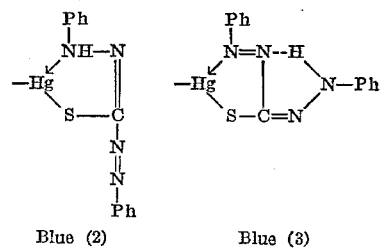

Blue (2)        Blue (3)

The invention is illustrated by the following examples in which the parts and percentages given are by weight.

EXAMPLE 1

(p-Aminophenyl)mercuric dithizonate

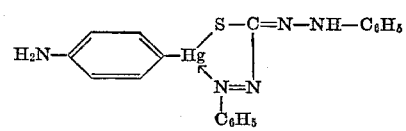

To a vigorously stirred mixture of about 150 parts chloroform and 100 parts water there was added 5 parts (0.0142 mole) p-aminophenylmercuric acetate, 3.78 parts (0.045 mole) sodium bicarbonate and 3.33 parts (0.013 mole) diphenylthiocarbazone in portions. The mixture changed color from purple to orange. After stirring for 15 minutes, the chloroform was evaporated under reduced pressure and the product was isolated by filtration. Recrystallization from acetone gave 3 parts of fine orange needles, M.P. 191.5–192.5° C. Recovery from the mother liquor increased the total yield to 4 parts.

Calc'd for $C_{19}H_{17}HgN_5S$ (percent): C, 41.6; H, 3.13; Hg, 36.6; N, 12.8; S, 5.85. Found (percent): C, 42.0; H, 3.06; Hg, 36.6; N, 12.9; S, 5.81.

EXAMPLE 2 p-[(4,6-dichloro-s-triazin-2-yl)amino]phenylmercuric dithizonate

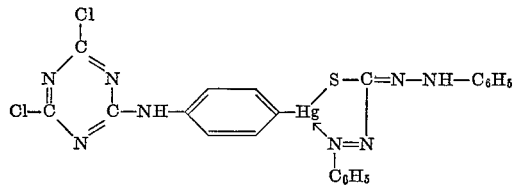

To a solution of 0.5 part (0.00091 mole) of the product of Example 1 in about 80 parts acetone and 10 parts water at −2° C., there was added with stirring 0.153 part (0.00182 mole) sodium bicarbonate and 0.168 part (0.00091 mole) cyanuric chloride. The resulting solution was stirred for 15 minutes at −2° C., and then poured into a mixture of 200 parts ice and 300 parts water. Filtration gave 0.7 part of product which, after recrystallization from acetone, appeared as orange-red crystals melting at 126.5–127.5° C.

Calc'd for $C_{22}H_{16}Cl_2HgN_8S$ (percent): C, 37.9; H, 2.32; Cl, 10.2; Hg, 28.8; N, 16.1; S, 4.61. Found (percent): C, 37.9; H, 2.17; Cl, 9.84; Hg, 28.5; N, 16.6; S, 4.41.

The corresponding p - [(dichloropyrimidinyl)amino] phenylmercuric dithizonate, p-(chloroacetylamino)phenylmercuric dithizonate and p-(beta-chloropropionylamino)phenylmercuric dithizonate are obtained when the above procedure is repeated substituting equivalent amounts of 2,4,6-trichloropyrimidine, chloroacetyl chloride and beta-chloropropionyl chloride, respectively, for the cyanuric chloride used therein.

EXAMPLE 3 p-[N-(beta-chloroethyl)sulfamoyl]phenylmercuric dithizonate

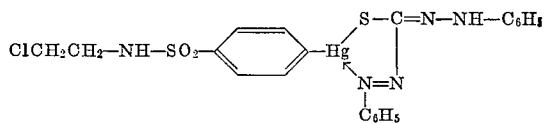

The procedure of Example 1 is repeated substituting an equivalent amount of p-[N-(beta-chloroethyl)sulfamoyl]phenylmercuric chloride (prepared from the corresponding phenyldiazonium chloride by reaction with mercuric chloride and cuprous chloride) for the p-aminophenylmercuric acetate.

The corresponding p-substituted phenylmercuric dithizonates are obtained when the above procedure is repeated with substitution of p-(beta-chloroethylsulfonyl) phenylmercuric chloride, p-(beta - sulfatoethylsulfonyl) phenylmercuric chloride, p - (vinylsulfonyl)phenylmercuric chloride, p-[N-(beta-sulfatoethyl)sulfamoyl]phenylmercuric chloride or p-[N,N-bis(beta-carbamoylethyl)sulfamoyl]phenylmercuric chloride for the p-[N-(betachloroethyl)sulfamoyl]phenylmercuric chloride. Reaction of the p-[N,N-bis(beta-carbamoylethyl)sulfamoyl]phenylmercuric dithizonate with an excess of formaldehyde under mildly alkaline conditions provides the desired methylolated p - [N,N - bis(beta - carbamoylethyl)sulfamoyl]phenylmercuric dithizonate.

APPLICATION AND EVALUATION

Aqueous dispersions of the dye compounds of Examples 1 and 2 were prepared by pouring an acetone solution of the dye into a dilute solution of Duponol WA (sodium lauryl sulfate) in distilled water. These dispersions were used to carry out dyeings on spun nylon fabric using the following concentrations (percentages based on the weight of the fiber): 1% dye; 5% Duponol WA; 80 to 1 liquor to fabric ratio.

Dyeing was carried out for 30 minutes at the boil. Compound 1 produced a red shade on the nylon while the dyeing of 2 was orange. Portions of each fabric were then treated for 10 minutes at the boil with:

(a) Neutral soap solution;
(b) pH 10 $Na_2CO_3$ solution (alkaline fixing bath).

The untreated, soaped and alkaline fixed fabrics were each extracted for one hour in boiling n-propanol. The percent dye remaining on the various fabrics was then estimated from visible reflectance curves. Reflectance spectra were obtained using a recording spectrophotometer. The results are presented in Table I.

TABLE I.—DYEING ON NYLON

| Treatment | Relative Percent Compound of Ex. 1 | Relative Percent Compound of Ex. 2 |
| --- | --- | --- |
| Untreated, unextracted | 100 | 100 |
| Untreated, extracted | 4 | 34 |
| Soaped, extracted | 5 | 53 |
| Alkaline fixed, extracted | 6 | 55 |

These results show that essentially all of the unreactive compound of Example 1 was removed by the extraction with n-propanol, while a substantial portion of the reactive compound of Example 2 remained fixed after the extraction. The data show that some of the reactive compound reacted with the fabric during the dyeing procedure and additional fixation occurred during the soaping and alkaline treatments.

Essentially similar results are obtained with nylon dyeings utilizing, in place of triazinyl derivative of Example 2, any one of the other dervatives of the mercuric complexes of diaryl thiocarbazones embraced by Formula I.

Upon exposure to bright sunlight, the color of the alkaline-fixed, extracted dyeing with the compound of Example 2 changed from the original orange, through various shades of gray, to a final dull blue. When removed from the sunlight the color returned to the original orange. The time required for this return is dependent on such factors as ambient light level, the temperature of the fabric and its moisture content. Thus, soaking the fabric in water causes a very rapid return to the original orange color. It is, therefore, seen that the photochromic properties of the dye is retained even though the dye is bound to the fiber through the newly introduced fiber-reactive linkage.

We claim:

1. A compound represented by the formula

D—M where D is

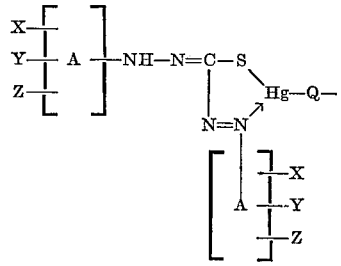

wherein Q is a divalent aromatic radical selected from the group consisting of phenylene, tolylene and naphthylene, A is an aryl radical selected from the group consisting of phenyl and napthyl, X, Y and Z are individually hydrogen, lower alkyl, lower alkoxy, halo, nitro or di-lower alkylamino radicals and M is (a) 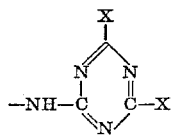

where X is chloro or bromo, Y is chloro, bromo, lower alkyl, amino, phenyl, lower alkylamino, phenoxy, lower alkylthio or —NH—D.

(b) 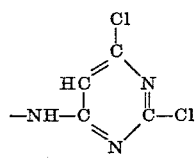

(c) 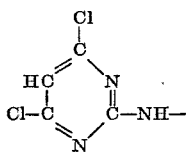

(d) —NH—CO—CH$_2$—Cl
(e) —SO$_2$—CH$_2$—CH$_2$—Cl
(f) SO$_2$—CH$_2$—CH$_2$—O—SO$_3$H
(g) —SO$_2$—CH=CH$_2$
(h) —SO$_2$—NH—CH$_2$—CH$_2$—Cl
(i) —SO$_2$—NH—CH$_2$—CH$_2$—O—SO$_3$H, or
(j) —SO$_2$—N(CH$_2$—CH$_2$—CO—NH—CH$_2$OH)$_2$.

2. A compound represented by the formula

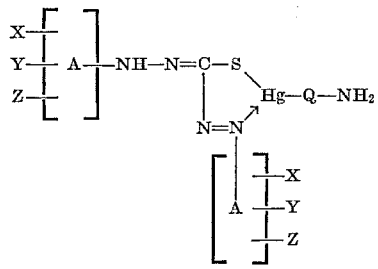

wherein Q is a divalent aromatic radical selected from the group consisting of phenylene, tolylene and naphthylene, A is an aryl radical selected from the group consisting of phenyl and naphthyl, and X, Y and Z are individually hydrogen, lower alkyl, lower alkoxy, halo, nitro or di-lower alkylamino radicals.

3. The -compound p - [(4,6 - dichloro-s-triazin-2-yl)-amino]phenylmercuric dithizonate.

4. The compound p-[N-(beta-chloroethyl)sulfamoyl]-phenylmercuric dithizonate.

5. The compound (p - aminophenyl)mercuric dithizonate.

References Cited
UNITED STATES PATENTS 3,359,254  12/1967  Kazan _____ 260—149

CHARLES B. PARKER, Primary Examiner

D. M. PAPUGA, Assistant Examiner

U.S. Cl. X.R.

260—148, 149; 8—42, 55